Dec. 19, 1939.  E. A. TAYLOR  2,184,131
MEANS AND METHOD OF TREATING EYES
Filed May 29, 1936  2 Sheets-Sheet 1
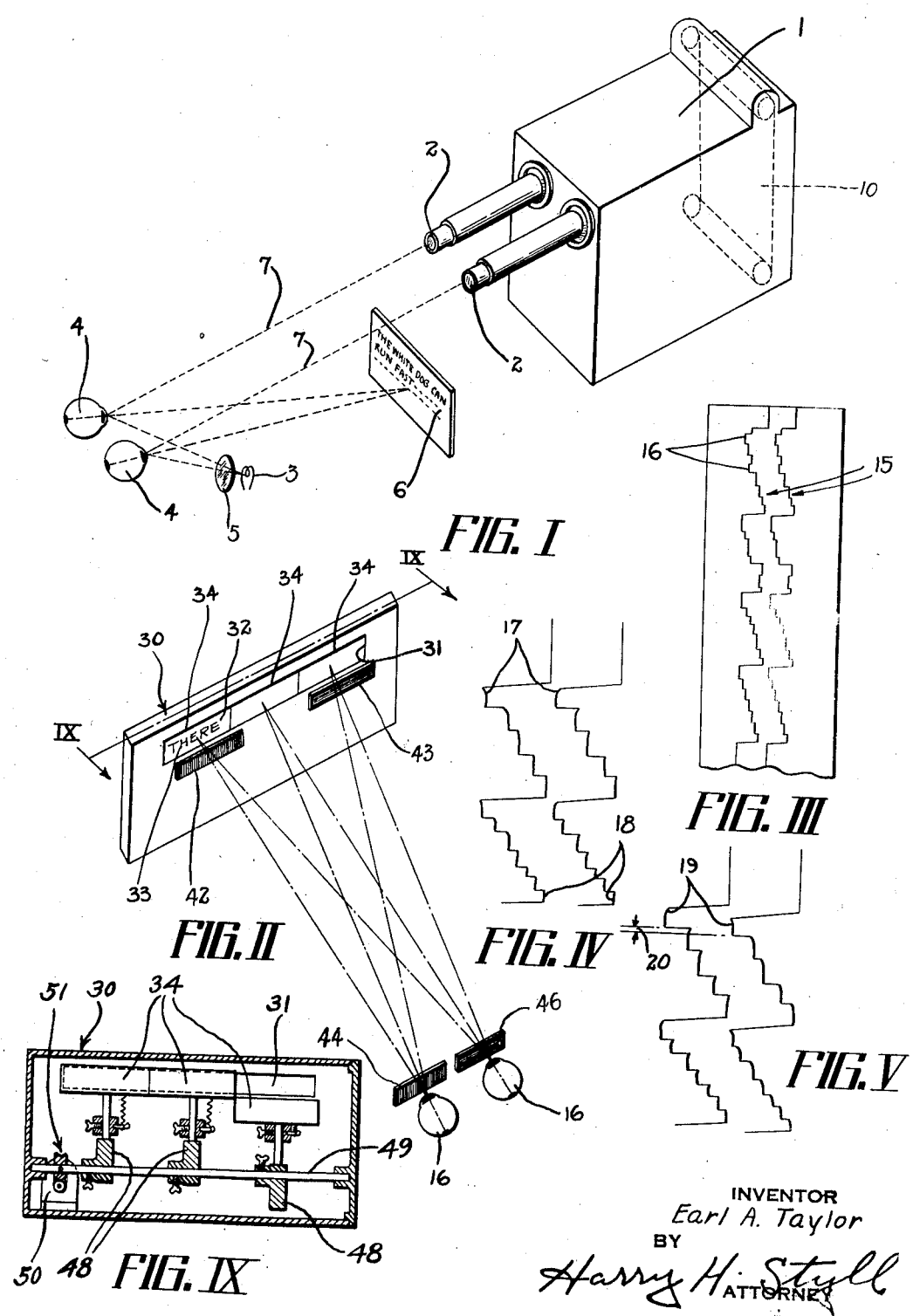
INVENTOR
Earl A. Taylor
BY
Harry H. Styll
ATTORNEY Dec. 19, 1939.  E. A. TAYLOR  2,184,131
MEANS AND METHOD OF TREATING EYES
Filed May 29, 1936  2 Sheets-Sheet 2
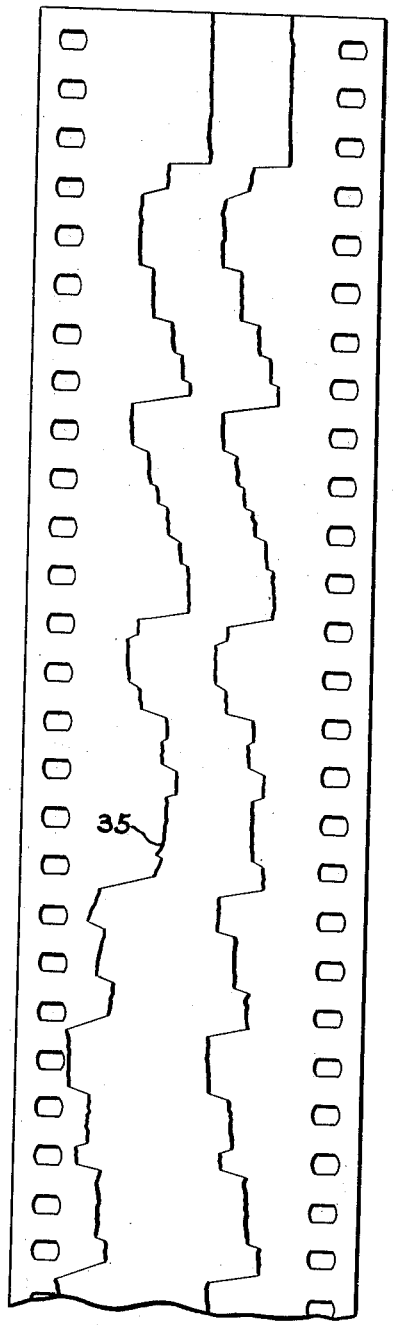
FIG. VI
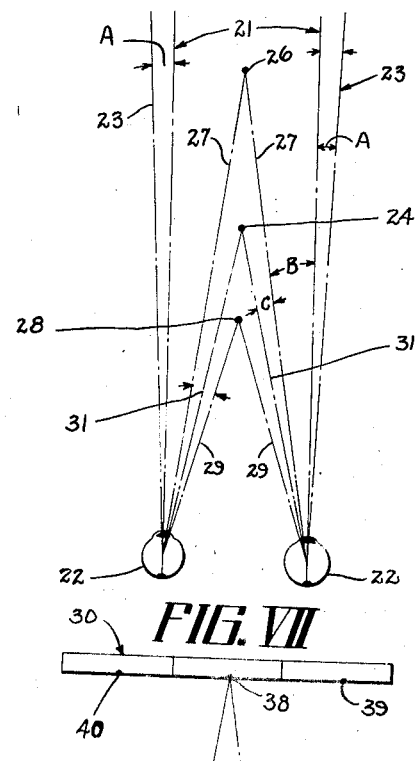
FIG. VII
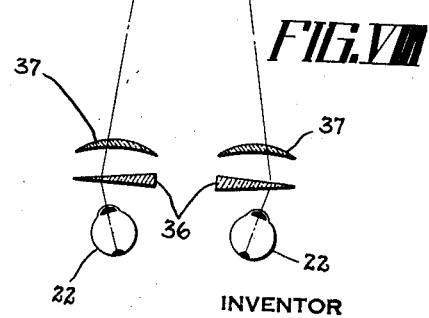
FIG. VIII
INVENTOR
Earl A. Taylor
BY
Harry H. Stull
ATTORNEY Patented Dec. 19, 1939

2,184,131

UNITED STATES PATENT OFFICE 2,184,131

MEANS AND METHOD OF TREATING EYES

Earl A. Taylor, Chicago, Ill., assignor to Educational Laboratories, Inc., Brownwood, Tex., a corporation of Texas Application May 29, 1936, Serial No. 82,530

3 Claims. (Cl. 88—20)

This invention relates to new and useful improvements in methods of eye training and particularly relates to a method for developing and increasing the efficiency of binocular vision.

One of the major objects of the invention is to provide an improved means and method of strengthening and balancing the muscles and innervating the nerves of the eyes in order to make the eyes capable of efficient cooperation during binocular vision.

Another object is to provide improved means and method for determining the effect of ocular anomalies on the behavior of the eyes under binocular stimulation, and for changing the anomalies whereby better binocular vision is obtained.

Another object is to provide improved means and method for determining the relation between the accommodative and convergence functions and for changing such relation whereby more efficient and comfortable binocular vision is obtained.

Another object is to provide improved means and method for determining the effect of an amblyopic eye on the behavior of the two eyes under actual working conditions of binocular stimulation and for changing the condition of said eye or eyes so that more comfortable and efficient binocular vision is obtained.

Another object is to provide a novel method of developing and changing the muscles and nerves of the eyes so that they will be able to quickly fixate binocularly on successive points.

Another object is to provide a novel method of strengthening and balancing the muscles of the eyes to obtain comfortable binocular fixation at the near point.

Other objects and advantages of the invention will become apparent from the following description taken in connection with the accompanying drawings, and it will be apparent that many changes may be made in the details of construction, arrangement of parts, and steps of the method shown and described without departing from the spirit of the invention as expressed in the accompanying claims. I, therefore, do not wish to be limited to the exact details and steps of the method shown and described, as the preferred forms only have been shown in the way of illustration.

Referring to the drawings:

Fig. I is a schematic view of an apparatus for recording the binocular movements of a person's eyes;

Fig. II is a schematic view of an apparatus which may be used to exercise the eyes in accordance with the invention;

Fig. III is a view of an illustration of a photographic record of the movements of a person's eyes while the person is reading;

Fig. IV is a view similar to Fig. III, illustrating a record of a pair of eyes which overconverge at the instant of binocular fixation;

Fig. V is a view similar to Fig. IV, but illustrating a record of the movements of a pair of eyes which underconverge at the instant of fixation;

Fig. VI is an enlarged reproduction of an actual record of a pair of eyes which are unable to obtain binocular vision after a short period of reading;

Fig. VII is a diagrammatic illustration of the action of a pair of eyes under binocular stimulation;

Fig. VIII is a view illustrating the manner of exercising the eyes by an apparatus such as shown in Fig. II; and Fig. IX is a sectional view taken on line IX—IX of Fig. II looking in the direction indicated by the arrows.

Developments in binocular recording of the movements of a person's eyes while the person is intermittently fixating on progressive points indicate that binocular coordination of the eyes is, in some instances, very poor, and in some cases binocular coordination is impossible. Since the human eyes are used mostly where they continually change their fixation at the near point, especially in reading, it is a significant fact that hundreds of studied cases indicate that persons who cannot control the movements of their eyes rapidly are usually poor readers and/or usually suffer from headaches, burning sensations and various other ocular discomforts and their general efficiency is usually below normal.

Their reading is usually very inefficient due to inaccuracies of perception and consequent poor comprehension.

Since the eyes move in a series of fixation steps while observing anything closely, and especially while reading, it is desirable that both eyes move from one fixation point to the next point in rhythmical steps. It has been demonstrated that the speed and comprehension of a person during reading is very closely related to the number of steps or pauses per line and the number of regressive movements per line. Failure of the eyes to coordinate and fixate accurately on the subject matter or symbols under consideration increases the number of pauses and regressive movements of the eyes.

The inability of the person to control his eye movements or to maintain binocular fixation is closely related to muscular imbalances which may or may not be due to deficiencies in the innervation of the ocular muscles. In other words, such a defect may result in an improper duction ratio. Such a deficiency, sometimes designated as a "convergence insufficiency", often results in discomfort in near point work.

There is a close relation between convergence of the eyes and the power of accommodation. For instance, when a person is looking at a distant object the eyes are in a more nearly relaxed condition with the axes of straight ahead vision of both eyes about parallel and the optical system of the eyes focused or accommodated for the far object. When a person looks at a near object the two eyes must be simultaneously converged and the optical system of the eyes must focus the image of the near object on the retina for a sharp image. It is generally believed that there is a common impulse from the brain which controls these two functions of versional movements and focusing of the optical system. A pair of normal eyes, that is, eyes with good visual acuity and the proper muscular balance can simultaneously accommodate and converge in a coordinated manner so that each retina has the proper attention value for the brain to receive the best impression for correct translation of any given environmental stumulus.

The ocular system of the human body is in reality two receivers of light waves which are physically tied up by muscles and nerves which tend to move the eyes in unison and in timed relation at all times. Many conditions arise, such as refractive errors in the optical system of either eye, so that the other eye tends to do all the seeing and the eye with the error becomes lazy and inert. Consequently, the ability of its muscles to function decreases and it is not able to follow the good eye with the result that a great deal of strain is placed on the whole nervous system of the individual. Also the inability of the two eyes to fixate on the same point results in a conflict in the fusional centers of the brain which often results in a partial or complete suppression of the vision of one eye. This is a compensatory reaction of the organism and in making this compensation a noticeable squint sometimes develops.

A person may be able to obtain apparently normal binocular vision either with or without corrective lenses for short periods of time for certain distances and certain kinds of work, but after an extended period of such, the mental and physical systems become greatly fatigued. When the mental and physical systems are fatigued, efficient vision and perception are greatly impaired and the outward appearance may be a lack of cooperation between the accommodation and orientation functions of the eyes. This may be due to normally weak muscles or a deficiency in the innervation of these muscles or weakness created by abnormal strains resulting in fatigue.

When a person has been suffering from unequal vision in the separate eyes for an extended period of time, whether the defect is due to refractive errors or muscular errors, inefficient motor habits may become so thoroughly established as to remain after the physical or physiological causes have been remedied or neutralized.

In order to maintain high visual efficiency the proper strength and balance of the muscles of the eyes and their nerves must be brought about by the proper exercise by stimulating the involuntary action of the eyes in binocular vision resulting in changed strength and balance of the muscles and nerve supply.

The present invention is primarily directed to a method for giving controlled and determinable exercise training to the eyes in order to condition efficient and comfortable vision.

Broadly, the invention contemplates a method of diagnosis and training of the eyes to recondition the physical structure of the muscles and nerves of the eyes to obtain efficient binocular vision.

Referring particularly to the drawings, schematic illustrations of conventional apparatus are shown for carrying out the objects of my invention.

In carrying out my invention a person whose eyes are to be trained is first given the usual and well known refraction tests to determine optical errors under normal relaxation. This is followed by an eye-movement photograph taken while the subject is reading, with or without a lens correction, a selection placed before him. Such a record of a person's eyes before training is shown in Fig. III.

In Fig. I, an embodiment of an apparatus for making a record of the simultaneous eye movements comprises a camera 1, having a photographic film 10 adapted to be moved at a continuous, uniform speed on which a beam of light reflected from each eye is focused by a lens system 2. A suitable source of light 3, is suitably positioned, preferably removed from the axes of the lens systems 2, for causing a beam of light 7 to be reflected from each eye, indicated at 4, through the lens system on to the moving film. The source of illumination 3 may be ordinary white light, or may consist of any other source of radiant energy which will be reflected from the human eye and which will affect the sensitized photographic film. For instance, infra-red rays, which are invisible to the human eyes, may be used to record the eye movements. Any other invisible rays, which are not injurious to the eyes, may be used.

Also ultra-violet rays and polarized light rays, as well as the rays comprising any one or more colors may be used, so long as a photographic film is used which is sensitive to the rays utilized.

The source 3 may comprise only the rays desired, or a source may be utilized containing rays other than those desired with filter means, such as shown at 5, for eliminating the undesired radiations. Any suitable symbols, preferably printed matter 6, for the person to read are placed in a convenient position before the eyes. The details of the apparatus form no direct part of the present invention other than to set forth means by which one step of the process is performed, and are, therefore, not described in detail. A detailed description of the apparatus for making such photographic records is shown and claimed in copending application, Serial No. 711,942.

As the person reads the printed matter 6, his eyes tend to binocularly fixate on the different words and word groups. Movement of the eyes causes the beams of light 7, reflected from the eyes to move an amount a little less than one-half the actual excursion of the eye but in the same direction. These horizontal eye movements are recorded on the vertically moving film for a later detailed study. The important feature of this binocular record is that it will indicate the effect of the ocular anomalies on the movements of the eyes when they are under actual working conditions. In other words, the condition of the physical structure tying the eyes together, is objectively determined under dynamic conditions while the eyes are being used in near point work.

The binocular fixations on the different words and word groups cause the eyes to proceed by short halts or jerks. During these halts or fixations, which will be recorded as short lines 15 (see Fig. III) since the film is continually moving, reading takes place. The short lines connecting the vertical lines indicate the lateral movements of the eyes from fixation to fixation and from one end of a line to the beginning of the next. The record shows up as a series of "stairsteps" as shown in Figs. III, IV, V and VI. The more words the patient can visually perceive during the halt or fixation, the fewer fixations he has to make to read a given line. The number of words or the amount of reading matter that the person can read with one fixation is called the "span of perception".

Suppose a pair of eyes stops ten times to read a line of eight words, then the span of perception is eight-tenths words. From the purely physiological viewpoint a person with good vision should be able to read four or five average words per fixation because at five degrees off the macula the visual acuity is still sufficiently high for good average print. This large span of recognition is, however, rarely attained, probably because the two eyes are not able to fix themselves relative to each other with sufficient accuracy during the halts or fixations, or due to a lack of sensitivity of the retina over the paracentral field. Average good readers among college students have a span of recognition of about one and one-fifth words.

To facilitate an understanding and a study of the record it is turned upside down and reversed as shown in Figure VI. In this way the right stairway pictures the movements of the left eye while the left stairway depicts the movements of the right eye of the patient.

At the end of each vertical line there is a thin horizontal line made by the "return sweep" of the eyes from the end of one line to the beginning of a new one, as shown in Fig. III. Each vertical line or step in the record represents an eye pause or fixation. The longer the eyes are held in one position, the longer are these vertical lines. In other words, the length of these lines show the duration of each fixation. A "regression" or backward movement of the eyes is shown as a step back to the left after the patient has started to read a line, as indicated at 16 in Fig. III. It should be stated here that, due to the arrangement of the optical system, the direction of movement of the eyes is opposite in sense to the direction of movement of the beam of light striking the film, so that for converging movement of the eyes the records on the film will move apart, and vice versa. Also, when one eye moves up, its record will move down.

Since the film travels at a known speed, the length of the vertical lines represents the duration of the fixations as has been stated. Accordingly, the length of the photographic record represents the total time required to read any given amount of reading matter.

During reading a person must repeatedly move his eyes from one point of fixation to another on the reading matter, and the eyes are probably temporarily disassociated since vision is poor while the eyes are in motion. The eyes tend to return to their habitual positions of rest when disassociated and their movements to maintain single binocular vision on the next fixation are clearly shown on the photographic record.

Parallel "stairways" denote that the eyes do not overconverge or underconverge at the instants of binocular fixation throughout the reading graph. When the short vertical lines are spread at the top, as at 17, Fig. IV, it is indicative of overconvergence; when the upper ends are closer than the lower part they denote divergence, as at 19, Fig. V. A vertical line appearing lower than its corresponding vertical line belonging to the other eye means that the first eye moved up in relation to its mate. This sometimes is indicative of a hyperphoria but in making such a deduction, one must be positive that there was no head motion during the reading. Thus the records above described afford an excellent objective means and method of determining the effect of the ocular anomalies upon the behavior of the eyes under actual conditions of binocular vision.

A "creeping" or changing overconvergence may also occur during reading. In such cases the distance between the records is greater at 17 than it is at 18, Fig. IV.

In Figure VI is shown an enlarged reproduction of a record of an actual case where after the person had read for a short while his right eye broke fusion at the point 35 and the person continued reading with only one eye. This is an excellent example of a compensatory reaction made by the organism in avoiding a fusional conflict.

With reference to Fig. VII, a graphic illustration of the action of the eyes is shown. The lines 21 indicate the axes of vision of a pair of eyes 22, when the eyes are looking at infinity. We will assume that the lines 23 indicate the position of the visual axes when the eyes are disassociated and under relaxed accommodation. The angle between these lines 21 and 23, indicated at A, is what is known as the tonic convergence angle, which may be due to any of a number of causes. The position of the axes of vision of the eyes may be convergent instead of divergent as shown, depending upon the condition of the eyes in question.

As is well known when the eyes attempt to fix binocularly upon a near point, there is an innervation of the muscles of the eyes which causes the eyes to simultaneously converge and accommodate for the near point in order to maintain fusion. In the emmetropic or optically perfect eye (rare), the eye always accommodates and converges the proper amount to see clearly at any given distance. If this balance of convergence and accommodation is disturbed in any of a very great number of ways, excessive dissipation of neural energy is necessary in attempting to maintain single binocular vision. Still referring to Fig. VII, if the person wishes to look at the point 24, in order to get single binocular vision, both of the eyes should converge and accommodate a proper amount so that both of the eyes get a clear cut image of the point 24. But if there is an imbalance between the convergence and accommodative functions, the eyes may accommodate properly to get a clear cut image of the point 24, but the amount of convergence accompanying such accommodation may be only sufficient to bring the axes of vision of the two eyes to fixate on a point 26, which is at the intersection of the axes of vision. It would be impossible for the person to see a single image of point 24 while his eyes were converged on the point 26. The natural reaction of the organism is to coordinate the movements of the two eyes so that the images on both retinas will fuse for single binocular vision. In the case just mentioned, the eyes would have to be converged more so that they would both be fixed on the point 24, the eyes having been already accommodated for the point 24. The angular movement of the eyes from the position of relaxation to their innermost position, indicated by the lines 27, due to the convergent impulse that accompanies the accommodative function is called the accommodative convergence and is indicated in Fig. VII by the angle B. The angle to which the eyes must converge to move from the point 26 to the point 24 to get fusion is known as fusional convergence and is indicated as angle C. In some instances the amount of convergence accompanying the accommodative function may cause the eyes to move beyond the point on which the eyes are tending to fixate, to a point 28. Then the fusional convergence under such a condition would be indicated by the angle between the lines 29, when the eyes are fixed on the point 28, and the lines 31, indicating the axes of vision when the eyes are fixed on the point 24. In either event, the amount of excessive fusional convergence required to bring both of the eyes into the proper relation to get single binocular vision causes a great expenditure of nervous and physical energy sometimes causing great discomfort to the person if he cannot compensate for the defect. It will be readily understood that a person who has an excessive amount of fusional convergence would be unable to read rapidly and efficiently because it would take longer for him to fixate binocularly upon the different words or word groups than it would a person who had a balanced condition between fusional and accommodative convergence. In other words, his perception time would be longer than that of a normal individual without such a deficiency.

From the diagram of Fig. VII, it will readily be understood that the accommodative and tonic convergence may combine to give the proper amount of convergence accompanying the accommodation functions and the person would not have difficulty in getting accurate single binocular vision and he might not experience uncomfortable vision at the near point. In other words, under the usual static phoria test a person may show either an exophoric or an esophoric condition and under actual working conditions he may or may not overconverge or underconverge while reading. The amount of overconvergence or underconvergence may be controlled by altering the amount the person must accommodate through the use of proper lenses, but if the lenses used to eliminate the stress due to imbalance do not give the proper optical correction, the patient cannot get efficient vision. It will also be apparent that for a certain amount of tonic and accommodative convergence a person may be able to get comfortable binocular vision at certain distances and not at other distances.

The imbalance between the accommodative and convergence functions of the eyes may be partially overcome by the use of lenses or prisms which may be used to increase or decrease the amount of accommodation with respect to the convergence, and vice versa. It will be understood that refractive devices alone can only produce a fixed change in relation between the two functions. A refractive correction to obtain a desirable relationship between the two functions for certain distances may cause over-stimulation or under-stimulation of one of the functions for other distances. Therefore, it is desirable that the muscles and nerves of the eyes be conditioned so that the proper relative stimulations of accommodation and convergence are obtained for all points of convergence of the eyes in order that excessive fusional convergence efforts are not required. According to this invention, this is done by causing an alternate tension and relaxation of the muscles of the eyes which control the vergence and accommodative functions for binocular vision by exercises given for any distance determined by the location of the display device. Also, according to this invention, one or part of the functions of accommodation and convergence may be held in check or stimulated by optical means while the other function is stimulated under actual working conditions.

Fig. II shows a diagrammatic illustration of an apparatus for carrying out training of the eyes to improve the physical condition and improve the balance of the innervation of the muscles tying the two eyes together into a single visual system.

The embodiment shown diagrammatically comprises a display device 30 which has an elongated window 31 in its front wall. The device is provided with a roll or exhibitor 32 bearing indicia 33 and mounted to travel intermittently therein to present different parts of the indicia. Three shutters or panels 34 are provided to cover separate portions of the window and are arranged to be moved up and down by means of cam members 48 connected to a shaft 49 driven by a motor 50 through the worm and worm gear 51 to consecutively and periodically exhibit portions of the indicia 33 in lateral progression, preferably in the direction of normal reading from left to right. As soon as all of the panels are operated in sequence the exhibitor 32 is operated to bring the next line of indicia before the window. The details of this device are fully set forth in Patent Number 1,918,298 and dated July 18, 1933. It is to be understood, however, that the apparatus forms no part of the present invention other than to illustrate means by which a step in the process is performed, and that any suitable device for exhibiting symbols such as by projection of images of symbols on a screen may be used.

In cases where there is a tendency for one or the other of the eyes to suppress or suspend vision, although the person may be unaware of the condition or actual suspension of vision, as shown at the point 36 in Figure VI, it is sometimes desirable to provide means whereby the person must use both eyes in order to follow the subject matter of the material being presented. In order to urge the person to use both eyes while reading the intermittently presented symbols, means may be placed before the eyes, which cooperate with means adjacent the subject matter for preventing each eye from seeing all of the shutters of the display device.

As shown in Figure II, suitable means, such as transparent light polarizing windows 42 and 43, are placed before the two outer shutter openings in the display device 30 so that their axes of polarization as indicated by the fine lines, are at right angles to each other. Just in front of the left eye another light polarizing screen or filter 44 is so positioned that the axis of polarization is parallel to the axis of polarization of the screen or filter 42.

Another screen 46 is placed before the right eye in such a position that its plane of polarization is parallel to the plane of polarization of the screen 43 and at right angles to the plane of polarization of the screen 42. With such an arrangement it will be noted that only the left eye can see the symbol or symbols behind the screen 42 and only the right eye can see the symbol or symbols behind the screen 43, while both eyes will be able to see the symbol or symbols presented by the middle shutter of the display device 30. Therefore, as the display device 30 is in operation, both eyes must be used in order for the person to be able to read all of the symbols in all three shutters. This breaks down the habit of the person to suspend vision in either eye, since the interest created in the person stimulates vision in the eye which normally tends to suspend, in order that no part of the symbols will be lost.

It is to be understood that such an arrangement can also be used to readily determine whether or not one or the other of the eyes is amblyopic.

It will be readily seen that the screens 42, 43, 44 and 46 may have their axes of polarization varied so that the left eye cannot see the left shutter and the right cannot see the right shutter. Instead of using light polarizing devices the screens above mentioned may be light filters of complementary colors so that each eye cannot see at least one of the shutters. The effect and operation of color filters would be substantially similar to that described above in connection with the light polarizing devices. Of course, any suitable illuminating means (not shown) may be provided to illuminate the symbols on the display device, if desired.

In Fig. VIII the method of treating the eyes in accordance with this invention is diagrammatically illustrated. The patient is caused to view consecutively and periodically displayed fixation symbols in lateral progression in the meridian of normal reading, in any convenient manner as described above. In cases where it is only necessary to build up a reserve of the innervation of the muscles for better comfort of vision the patient may be caused to read heterogeneous words or word groups arranged in story form on the display device 30 illustrated in Fig. II. But where there is an imbalance between the accommodative and convergence functions, better results are obtained by causing the eyes of the patient to deviate from their position of binocular fixation while they are caused to view the fixation symbols periodically presented in lateral progression. Preferably, this is done by interposing one or two prisms before the patient's eyes while he reads. The power of the prisms and the position of the base for improving the physical condition of the binocular system will be determined by a study of the results of the refractive tests and the photographic record of the movement of the eyes while the person is reading.

Still referring to Fig. VIII, a pair of eyes conventionally illustrated at 22, have placed before them a pair of prisms 36 and lenses 37. Assuming the condition in which under actual working conditions the patient's eyes have a tendency to overconverge at the instant of fixation, as illustrated by the record in Fig. IV, and in which the refractive tests showed that the patient was normally accommodating an excessive amount, the lenses 37 would be plus and would have a power substantially sufficient to relax the accommodation of the person when viewing the symbols of the display apparatus 30. The effective bases of the prisms 36 are preferably placed inward in order that the eyes must deviate outwardly from their position of binocular fixation in order to see the symbols on the display device 30. For the purpose of clarity we will assume that the person is looking at the fixation field of the middle panel of the display device 30, indicated by a point 38. In order for the person to see the field represented by the point 38 with a single binocular vision, his eyes must deviate outwardly from the position of binocular fixation due to the bending of the light rays by the prisms 36. When the fixation field represented by the point 38 is removed, as when the shutter closes off the view to the patient and the next panel on the right-hand side moves down to expose the next fixation field indicated by a point 39, the two eyes become temporarily disassociated. When the eyes are disassociated, fusion is broken and the eyes have a tendency to return to their position of relaxation. Fusion is broken as the eyes move from 38 to 39 due to motion blindness, that is, the inability of the eyes to see clearly when they are moving relative to an object. It will be understood that as the eyes tend to return to their normal position of relaxation, the tension in the muscles which control the movements of the eyes are therefore relaxed during such lateral movement, but are again under tension as soon as the eyes attempt to fixate on the new fixation field. This alternate tension and relaxation on the ocular muscles greatly improves their response to the neural impulses and at the same time causes the neural impulses to be divided between the accommodative and convergence functions, whereby more comfortable and efficient reading is obtained. Also, by providing the control fixation points in the meridian of normal reading, the muscles are so developed that they are able to swing the eyes from side to side by rhythmical steps, which is so important in fast reading. It is, of course, to be understood that during the reading exercises the eyes would first fix upon the point 40, then point 38, and then the point 39, and so on. By changing the power of the lenses 37 the accommodative efforts usually accompanying the convergence functions may be changed with respect to the total convergence function or even entirely relaxed so that the internal and external recti muscles will receive a proper innervation to bring about a more desirable balance between the accommodative functions and the convergent functions. Likewise, the change in power of the prisms 36 may be used to vary the relation between the accommodative and convergent functions. In either event, one of the functions is exercised or innervated more than the other which results in a changed relation between the accommodative convergence and the accommodative function which will cause the patient to get more comfortable and efficient fast binocular vision. By taking a photographic record of the simultaneous movement of the eyes while the person is reading under normal conditions after the person has been treated with the prism reading above described, the improvement in the rhythmical movement of the eyes will be readily recorded.

If the photographic record shows that the person is underconverging at each fixation as indicated in Fig. V, most of the prism reading will be given with prisms base outward. The power of the prisms and of the lenses may be varied, as described above, in order to produce a changed relation between the accommodative functions and the convergent functions to produce more efficient relation. As set forth above, the simultaneous movements of the eyes of the person would be photographically recorded from time to time to note the improvement in the balance between the functions of the eyes, and to be sure that some unexpected imbalance has not developed.

It is to be understood that the training with the prism reading would not all be given at one time but would be divided up into a number of short periods. For instance, the usual procedure is to give trainings for about fifteen to twenty minutes per day, three or four times a week, or preferably daily. The number of trainings given will, of course, vary with the individual case, but usually between ten and twenty trainings are sufficient to show a very marked improvement. For eyes which actually do diverge or converge under actual working conditions so much that the patient cannot get single binocular vision all or part of the time, it is usually necessary to start trainings with the prisms so arranged that the light rays from the fixation point will be bent to obtain single binocular vision to stimulate the eyes to work together and then make the muscles of the eyes do more and more work by changing the effective power and base of the prism to build up a reserve innervation of the muscles in order that the eyes may be able to hold binocular fixation with comfort. The proper plus or minus lenses would be used as described above to fit the circumstances as shown by the refractive tests and from the photographic records taken from time to time during the training. The bases of the prisms may be altered from time to time after the eyes have been conditioned to work together in order to increase the dynamic duction ratios, that is, the ability of the person to read with binocular vision while overcoming prism power in either direction.

The step and the order in which they would be followed in treating a case are as follows:

The patient is first given the usual refraction test to determine errors of refraction. If the patient is wearing corrective lenses, their prescription would be checked to see that they properly correct the errors of the patient's eyes.

The simultaneous movements of the patient's eyes while reading are then recorded to determine the type of prism training to give the person to improve the muscle system which ties the two eyes into a single binocular system. The movement of the eyes is preferably photographed with the patient's eyes under the same conditions that the person has been using his eyes. In other words, if the person comes to the practitioner wearing glasses, his eye movements would be recorded while reading with those glasses, but if he were not used to wearing glasses he would be photographed without glasses, even though the refractive tests showed that he needed glasses. Before best results can be obtained from base-in and base-out training it is necessary that both eyes have substantially the same visual acuity and approximately the same amount of accommodation. In some instances it is necessary to begin training by using a prism base-up placed over one eye and another prism base-down placed over the other eye and of such total power that diplopia is produced and the subject is instructed to read first with one eye and then the other. In producing diplopia in this manner it may be necessary to use a red glass over one eye and a green one over the other. This color contrast in most instances will cause them to recognize two objects. By the use of base-up and base-down prisms to produce diplopia while the person is reading consecutively and periodically exposed symbols, the eyes involuntarily act as separate units. This gets the eyes into the best condition for subsequent action together as a system. During this training the bases of the prisms before each eye should be alternated from time to time in order not to produce a condition of hyperphoria. The sole purpose of this vertical displacement is to enhance the attention value of the retinal stimulation on the deficient retina. It is only in this way that the brain can recognize that it is receiving a stimulus from this retina.

The training with base-up and base-down prisms strengthens and develops the muscles of the eyes which move the eyes in the vertical meridians as well as teaches the eyes to act as separate units. If the patient is suffering from amblyopia or amblyopia ex anopsia, he reads with the weakest eye and improves the visual acuity thereof. Sometimes it is necessary to cover the good eye, but usually the subject uses his eye of better visual acuity to check what he sees with the bad eye. In most instances it is better to place the proper lens before the patient's eyes to give them as near perfect vision as possible. In an eye that has been in disuse for any length of time it is also necessary to stimulate the process of accommodation. This is done by using plus and minus lenses. It is just as necessary in exercising the accommodative process to stimulate inhibition of accommodation with plus lenses as it is to stimulate positive accommodation with minus lenses.

From time to time the movements of the patient's eyes are recorded as above described in order to determine the manner in which the balance of the muscles of the visual system is developing. If the fusion exercises build up the duction muscles out of proportion to the other of the six muscles of each eye, a hyperphoric or hypophoric condition may result. That is, one eye may have a tendency to turn up or down with respect to the normal position of rest.

The patient is caused to read with the base-in and/or base-out prisms until a ratio of about one to four of the external to internal recti muscles is produced. This has been found to give a proper condition for comfortable reading over long periods. In order not to over exercise either the interni recti muscles or the externi recti muscles a reading ratio or duction is obtained before each period of exercise. The subject is seated before the instrument exposing the indicia and while he reads the indicia the prism power (or other means) is increased until diplopia occurs. This is carefully checked base-in and base-out and recorded as $$\frac{10^\Delta}{32^\Delta} \text{ or } \frac{8^\Delta}{16^\Delta}$$

in which case the numerator represents the point of diplopia in prism diopters where diplopia occurred for the externi muscles while the denominator represents the point of diplopia for the interni recti muscles.

As has been explained above, sometimes it is necessary to inhibit accommodation or develop it ahead of convergence. This is done by changing the effective focal plane of the consecutively and periodically displayed symbols, which may be accomplished either by changing the distance between the symbols and the patient or, preferably, by placing lenses of different focal power before the patient's eyes.

In treating cases with hyperphoria or hypophoria, that is, one eye tending to turn up or down, respectively, the prism exercises with base-up to correct the former and prism with base down to correct the latter condition are given.

It is to be understood that in all cases of unbalanced muscular control of the eyes, after the eyes have been trained to attain substantially equal visual acuity in both eyes, the person will be given training with prisms which give binocular vision and the prism power and base will be varied to increase the muscular effort to maintain binocular vision.

To further develop the coordination of the two eyes the patient may be caused to read a story, or other matter of interest may be exhibited consecutively and periodically to the patient to cause the eyes to move in controlled fixation steps.

Although I do not wish to limit my invention to any particular theory, it appears that the strengthening and conditioning of the muscular system tying the eyes together is due to the controlled fixation steps while the muscles of the eyes are alternately under relaxation and under stress trying to overcome the power of the prisms and/or the lenses. It is the desire of the organism to keep the refracted light focused on the macula, which is the stimulus for an attempt to redirect the visual axis as the prism power changes from time to time.

It is to be understood that the training herein described is not given all at one time but is usually broken up into periods ranging from ten to twenty minutes, each given between about three times a week or daily.

For very young children the procedure is substantially the same as herein described except that suitable colored pictures, etc. are used instead of words in story form.

The method of diagnosis and training according to this invention is very effective in obtaining excellent binocular coordination and at the same time introducing efficient and rapid reading habits and obtaining comfortable vision. The prism reading training above described develops rhythmical eye movements in reading by building up a more perfect balance between the six muscles of each eye to get better coordination between the two eyes.

From the foregoing description it will be readily apparent that by the present invention a novel method of training is provided whereby the refractive errors of the patient's eyes are first determined and then the simultaneous eye movements of the patient are recorded under actual conditions of use, and the condition of the muscles which tie the two eyes into a single binocular visual system is ascertained. The balance of the muscular system is improved through the stimulation of the individual eyes to balance their visual acuity and accommodation and then by periodically stimulating the two eyes simultaneously through prisms while the person is obtaining binocular vision and changing the base and power of the prisms to vary the muscular effort to maintain binocular vision. At the same time the effective focal plane of the stimulating means may also be varied. The simultaneous movements of the eyes under actual conditions of use are again photographed to note the improvement or to see that a different imbalance is not developing. This procedure is then followed until the desired improvement in the muscular balance and the binocular coordination has developed to the point of comfortable and efficient vision.

It is to be understood that this invention is not to be limited to any theory set forth herein, but hundreds of cases have shown that very beneficial results have been accomplished by my method.

The term "binocular vision" as used herein is used in a generic sense to denote the condition under which the images received by both eyes are fused into one by the brain. The term "instant of binocular fixation" as used in the specification and claims, is used to indicate the interval just prior to as well as the instant of actual fusion.

Having described my invention, I claim:

1. The method of coordinating the functions of the eyes of an individual comprising determining the behavior of the eyes under ordinary conditions of actual use, as when reading, by photographically recording the simultaneous movements of the eyes during said reading, determining the variations of the eye movements from normal from said photographic recording, treating the eyes by exhibiting fixation indicia to the view of said individual a section only at a time in spaced progression and sequence in the direction of reading to cause the eyes of said individual viewing said fixation indicia to consecutively and periodically break and reestablish fusion while simultaneously causing the eyes of the individual to view said intermittent exhibitions of indicia through optical means having characteristics which are controlled to optically deflect the rays emanating from the indicia an amount controlled by the variations of said eye movements from normal as determined by said photographic recording sufficient to position the indicia within the fusional range of the eyes and also to locate said indicia by optical deflection a predetermined amount offset from the position at which said indicia should be located to compensate for the particular deficiencies of the eyes so as to cause stress predominately on the deficient portion of the muscular structure of the eyes as the organism of the eyes responds to said intermittently exposed sections of indicia, which stress will strengthen and innervate said deficient portion, and subsequently determining the behavior of the eyes under ordinary conditions of use, as when reading, by again photographically recording the movements of the eyes while reading and comparing said last named record with the first.

2. The method of coordinating the functions of the eyes of an individual comprising determining the behavior of the eyes under ordinary conditions of actual use as when reading by photographically recording the simultaneous movements of the eyes during said reading, studying said photographic recording to determine variations of the eye movements from normal, treating the eyes by exhibiting fixation indicia to the view of said individual a section only at a time in spaced progression and sequence in the direction of reading and simultaneously introducing effective prism displacement of said fixation indicia of an amount determined, in part, by said variations of said eye movements from normal to cause the eyes of said individual viewing said fixation indicia to consecutively and periodically break and reestablish fusion and simultaneously overcome the effective prism displacement of said images, said displacement being of an amount controlled, in part, to overcome the tendency of the eyes to deviate so as to bring the images of said intermittently exposed sections of indicia initially within the fusional range of the eyes and which is controlled, in part, to simultaneously position the images of said intermittently exposed sections of indicia controlled amounts offset from a position which would completely compensate for said tendency to deviate so as to introduce stress on the eyes when tending to obtain and maintain single binocular vision of said images and direct said stress predominately to the deficient portion of the muscular structure of the eyes as the organism of the eyes responds to said intermittently exposed sections of indicia and subsequently determining the behavior of the eyes after said treatment by again photographically recording the movements of the eyes under ordinary conditions of use, as when reading, and comparing said last named record with the first.

3. A photographing device for photographing the movements of a patient's eyes, comprising the combination of a camera housing having a moving recording film supported adjacent one end thereof and focusing means adjacent its opposite end, eye fixation means supported within the field of vision of said eyes, said fixation means having indicia for introducing eye movements when viewed by said eyes and being so positioned relative to the camera that the line of sight of the eyes viewing said indicia will be angularly disposed relative to the longitudinal axis of the focusing means, means for illuminating the face of said eye fixation means with means for producing a projected beam of invisible rays on to the corneas of said patient's eyes along a line which is angularly disposed relative to the longitudinal axis of the focusing means in such a manner that the rays reflected by said corneas will be received by said focusing means and will be focused upon said moving film, said film being sensitive to said invisible rays so as to record the eye movements on said film.

EARL A. TAYLOR.